UNITED STATES PATENT OFFICE.

WALTER DOLLFUS, OF HÖCHST-ON-THE-MAIN, GERMANY, ASSIGNOR TO FARBWERKE, VORM. MEISTER, LUCIUS & BRÜNING, OF HÖCHST-ON-THE-MAIN, GERMANY, A CORPORATION.

BLUE SULFUR DYE AND PROCESS OF MAKING SAME.

SPECIFICATION forming part of Letters Patent No. 710,766, dated October 7, 1902.

Application filed January 21, 1902. Serial No. 90,715. (Specimens.)

*To all whom it may concern:*

Be it known that I, WALTER DOLLFUS, Ph. D., a citizen of the Swiss Republic, and a resident of Höchst-on-the-Main, Germany, have invented a certain new and useful Blue Sulfur Dye and Process of Making the Same, of which the following is a specification.

I have found that a dyestuff of very valuable properties may be obtained if para-amido-para-oxydiphenylamin is heated with sulfids of alkali metals and sulfur at a temperature of from 100° to 130° centigrade.

Example: One part, by weight, of para-amido-para-oxydiphenylamin base dissolved in one part of warm water and 0.6 parts of soda-lye of 35° Baumé specific gravity is added to a solution of five parts of sodium sulfid and nine parts of water, and the boiling-point of the mixture is raised to about 120° centigrade by evaporation. Then two parts of ground sulfur are added and the mass is heated in a vessel provided with a reflux-condenser for about ten hours at about 120° centigrade, while stirring from time to time. The whole is then diluted with water slightly acidified by addition of dilute sulfuric acid, the precipitated greenish leuco compound of the dyestuff is filtered, washed with cold water, and the residue is stirred with warm water to form a thin paste, and then 2.3 parts of soda-lye of 35° Baumé specific gravity are added, whereupon the color becomes red violet. Then air is introduced till the whole of the dyestuff is separated as a blue precipitate almost insoluble in water. If more soda-lye is employed, a precipitate is obtained which is soluble in water. It is then filtered, pressed hydraulically, and the dyestuff is dried at a low temperature. When dry, it is a blue-black powder of bronze luster insoluble in the usual solvents.

The dyestuff dissolved in sodium sulfid or hydrosulfite dyes a bright indigo-blue, which becomes almost fast to washing on subsequent treatment with copper salts.

Having now described my invention, what I claim is—

1. The herein-described process for the manufacture of a blue dyestuff derived from para-amido-para-oxydiphenylamin being soluble or insoluble in water according to its preparation, which consists in heating for a considerable time to 100° to 130° centigrade para-amido-para-oxydiphenylamin with sulfur and sodium sulfid, substantially as set forth.

2. As a new product the blue dyestuff derived from para-amido-para-oxydiphenylamin as herein described, being when dry a blue-black powder of bronze luster soluble to some extent in the usual solvents and dyeing in a solution of sodium sulfid or hydrosulfite a bright indigo-blue which becomes absolutely fast on subsequent treatment with copper salts.

In testimony that I claim the foregoing as my invention I have signed my name in presence of two subscribing witnesses.

WALTER DOLLFUS.

Witnesses:
ALFRED BRISBOIS,
BERNHARD LYDECKER.